US008127041B2

(12) United States Patent
Leung et al.

(10) Patent No.: US 8,127,041 B2
(45) Date of Patent: Feb. 28, 2012

(54) DATACASTING SYSTEM WITH AUTOMATIC DELIVERY OF SERVICE MANGEMENT CAPABILITY

(75) Inventors: Yiu Man Leung, Franklin Township, NJ (US); Xiaofeng Liu, Cary, NC (US); Peter Andrew Mataga, Sparta, NJ (US); Igor Slepchin, Caldwell, NJ (US)

(73) Assignee: Roundbox, Inc., Forham Park, NJ (US)

( * ) Notice: Subject to any disclaimer, the term of this patent is extended or adjusted under 35 U.S.C. 154(b) by 104 days.

(21) Appl. No.: 12/436,724

(22) Filed: May 6, 2009

(65) Prior Publication Data

US 2009/0313383 A1    Dec. 17, 2009

Related U.S. Application Data

(60) Provisional application No. 61/097,740, filed on Sep. 17, 2008, provisional application No. 61/052,163, filed on May 9, 2008.

(51) Int. Cl.
*G06F 15/16* (2006.01)
*H04L 12/56* (2006.01)

(52) U.S. Cl. ........ 709/235; 709/219; 709/231; 370/469; 370/401; 370/432; 370/328; 370/312; 370/252; 370/270; 370/203; 370/317; 370/390; 725/25; 725/32; 725/34; 725/78; 725/80; 725/88; 725/95; 725/96; 725/97; 725/100; 725/102; 725/116; 725/131; 375/240; 375/240.01; 375/240.15

(58) Field of Classification Search .................. 709/219, 709/231, 235; 370/469, 401, 328, 432, 312, 370/252, 270, 203, 317, 390; 725/25, 32, 725/34, 78, 80, 88, 95, 96, 97, 100, 102, 725/116, 131; 375/240, 240.01, 240.15
See application file for complete search history.

(56) References Cited

U.S. PATENT DOCUMENTS 6,223,222 B1 * 4/2001 Fijolek et al. ................ 709/227
(Continued)

OTHER PUBLICATIONS

International Search Report and Written Opinion mailed Apr. 20, 2011 in Application No. PCT/US11/25756, filed Feb. 22, 2011.

*Primary Examiner* — John Follansbee
*Assistant Examiner* — Saket K Daftuar
(74) *Attorney, Agent, or Firm* — Kilpatrick Townsend & Stockton LLP

(57) ABSTRACT

A datacast system, and associated apparatus and method for automatically managing a data object or objects within a hierarchical carousel structure by enabling, among other functions, the dynamic allocation of bandwidth to each carousel within the structure. The dynamic bandwidth allocation enables a server platform to redistribute the bandwidth allocated to a carousel or set of data objects to adjust to desired changes in object transmission policies or priorities of a datacast application.

25 Claims, 9 Drawing Sheets

U.S. PATENT DOCUMENTS

| | | |
|---|---|---|
| 6,986,156 B1 * | 1/2006 | Rodriguez et al. ............... 725/95 |
| 7,340,759 B1 * | 3/2008 | Rodriguez ........................ 725/8 |
| 7,343,487 B2 | 3/2008 | Lindqvist et al. |
| 7,577,162 B2 * | 8/2009 | Liaw et al. ..................... 370/468 |
| 7,653,018 B2 * | 1/2010 | Regan et al. .................. 370/312 |
| 2001/0037378 A1 * | 11/2001 | Hirayama ..................... 709/219 |
| 2002/0167961 A1 * | 11/2002 | Haartsen ....................... 370/444 |
| 2003/0088778 A1 | 5/2003 | Lindqvist et al. |
| 2003/0217362 A1 * | 11/2003 | Summers et al. ............... 725/63 |
| 2004/0133907 A1 * | 7/2004 | Rodriguez et al. ............. 725/14 |
| 2004/0181800 A1 * | 9/2004 | Rakib et al. .................... 725/25 |
| 2004/0194143 A1 * | 9/2004 | Hirose ........................... 725/97 |
| 2005/0053094 A1 * | 3/2005 | Cain et al. .................... 370/469 |
| 2005/0071882 A1 * | 3/2005 | Rodriguez et al. ............. 725/95 |
| 2005/0125563 A1 * | 6/2005 | Douglas ........................ 709/250 |
| 2006/0023730 A1 * | 2/2006 | Regan et al. .................. 370/432 |
| 2006/0047845 A1 * | 3/2006 | Whited et al. ................. 709/231 |
| 2006/0117340 A1 * | 6/2006 | Pavlovskaia et al. ........... 725/34 |
| 2006/0200576 A1 * | 9/2006 | Pickens et al. ................ 709/231 |
| 2006/0262751 A1 | 11/2006 | Vermola et al. |
| 2007/0064732 A1 * | 3/2007 | Liaw et al. .................... 370/468 |
| 2007/0180119 A1 | 8/2007 | Khivesara et al. |
| 2008/0101460 A1 * | 5/2008 | Rodriguez ............... 375/240.01 |
| 2008/0287058 A1 | 11/2008 | Nahm et al. |
| 2009/0025027 A1 * | 1/2009 | Craner ........................... 725/32 |
| 2009/0041118 A1 * | 2/2009 | Pavlovskaia et al. .... 375/240.01 |
| 2009/0313383 A1 | 12/2009 | Leung et al. |

* cited by examiner

800

DATACASTING SYSTEM WITH AUTOMATIC DELIVERY OF SERVICE MANGEMENT CAPABILITY

CROSS REFERENCE TO RELATED APPLICATION

This application claims priority from U.S. Provisional Patent Application No. 61/097,740, filed Sep. 17, 2008, and entitled "Datacasting System With Automatic Delivery of Service Management", the contents of which are hereby incorporated in its entirety by reference. This application also claims priority from U.S. Provisional Patent Application No. 61/052,163, filed May 9, 2008, and entitled "Datacasting System With Intermittent Listener", the contents of which are hereby incorporated in its entirety by reference.

This application incorporates by reference the entire contents of the U.S. patent application Ser. No. 12/436,706 entitled "Datacasting System With Intermittent Listener Capability", filed May 6, 2009.

BACKGROUND

Embodiments of the present invention relate to datacasting systems, apparatus, and methods, and more specifically, to coordinating server and client behavior for transporting a set of data objects over a unidirectional packet network under circumstances in which the set of data objects being transmitted changes from time to time. More specifically, embodiments of the present invention relate to transporting an object from a server to one or more clients such that bandwidth usage is optimized for the overall system to rapidly deliver objects to clients that are listening at the time when the object is published, while also providing coverage protection to other clients that may have difficulty in receiving the objects during the first phase of transmission. Thus, the present invention enables a datacasting system to effectively operate in a situation in which the set of objects being distributed, and hence the bandwidth requirements on the system, change over time, while maintaining a desired level of delivery quality of service for the client devices receiving the objects.

A number of protocols exist that are designed to facilitate the distribution of data objects (e.g., files, notifications, events, etc.) over a unidirectional network (e.g., IP multicast or broadcast, unicast UDP networks). For simplicity, such networks will be referred to generically in this description as "datacast networks", and it will be understood that the term refers to the specific networks mentioned as well as similar data distribution networks. For packet-based technologies, the distribution of data objects involves object packetizing at the server (that is, breaking a data object into multiple smaller data packets), transmission over the network and reassembly of the data object from the packets at the client. The data objects are typically transmitted in the context of a logical session that is identified as part of the datacast protocol.

Datacasting algorithms must typically take into account a number of constraints or operating conditions. First, there is typically limited bandwidth due to, for example, constraints imposed by the transmission technology or medium as well as by the transmission network operator. Second, clients attempting to receive the packets may not receive all the packets, may not be continuously listening, or not be listening at the same time as one another. Both of these types of constraints become especially acute for wireless datacasting systems. In particular, wireless broadcast spectrum, and its associated bandwidth, are scarcer than other types of broadcast media. This scarcity often leads to tightly allocated usage of the broadcast spectrum, thus limiting overall bandwidth. Likewise, wireless clients are much less capable of listening in a continuous mode due to coverage problems or power consumption limitations.

One approach suited for file or data object distribution is to implement a datacast "carousel". As typically implemented, a carousel contains a set of data objects each of which is transmitted in turn one after the other in a cyclical fashion. Objects may be added to or removed from the carousel from time to time, but the carousel repeatedly cycles through the transmission of the objects. With this mode of operation, any client that joins a datacast in progress will acquire all the objects if it listens long enough. For certain simple applications where the set of objects on the carousel do not change often, such as for "offline file delivery" applications, this technique may be adequate to provide a desired level of service.

One approach that that has been tried for improving the operating characteristics of a simple data carousel is to implement a "fast" and a "slow" carousel for file transmission. In this approach, the data objects are divided into two subsets based on a partitioning criterion such as validity time or priority. One subset, typically a relatively small one (one day out of a weekly schedule, for example) is inserted into the "fast" carousel which provides a faster transmission while the rest of the data objects are inserted into a "slow" carousel which provides a slower transmission. One of the disadvantages of this arrangement is that the bandwidth for the carousels is generally pre-allocated based on the amount of data the application anticipates will be in each subset. There is no automatic management of bandwidth or object allocation to carousels, and these parameters change only on occasions where the overall content of the set of carousels is changed. Bandwidth utilization by the application and system is therefore not necessarily optimal using this approach. Another disadvantage of this arrangement is that the application providing the objects to be datacast must directly manage all aspects of this type of carousel, which makes the application more complicated to develop. Yet another disadvantage of this approach is that the corresponding client application must either listen to both carousels to get the complete set of data objects or be aware of some characteristic of the two carousels that enable the client application to more efficiently receive the desired objects. Typically, the client application directly manages this aspect of the listening behavior, so that it would require more complicated client application development. A further difficulty of this arrangement is that client applications generally are provided by multiple vendors; thus, making all client applications aware of the characteristics of the two carousels may require some form of coordination or standardization.

It is desirable that a client application acquire the transmitted data objects in the shortest time; however the acquisition time is inversely related to the available transmission bandwidth. It is also desirable to lower the processing requirements placed on the client application in order to preserve the battery life on the client device. As recognized by the inventors, existing approaches to the management of datacast services only effectively address certain types of static file or data object delivery sessions. Therefore, in circumstances where the type and number of such objects changes over time and the available bandwidth is limited, it would be desirable if the object delivery quality of service (DQoS) could be managed more precisely to optimize the balance between the acquisition time and available transmission bandwidth, while allowing the client application to receive the object with the highest probability (reliability) and minimal processing.

What is desired is a system, apparatus and method for more efficiently managing the distribution of data objects using a datacast system in the situation where the type and number of such objects changes over time, and which overcomes the noted disadvantages of present approaches to solving this problem.

SUMMARY

In some embodiments, the present invention is directed to systems, apparatus, and methods for efficiently managing the distribution of data objects using a datacast system. The present invention introduces the concept of a compound carousel and manages the transmission bandwidth associated with data objects placed into one or more elementary carousels that are part of the compound carousel. As new objects are added to the compound carousel, and as previously inserted objects are moved between elementary carousels within the compound carousel, the inventive system automatically allocates transmission bandwidth between objects and carousels in order to optimize the delivery of all data objects subject to the overall bandwidth constraints of the system.

In one embodiment, the present invention is directed to a method of operating a datacast platform for broadcasting a data object over a network to a client device, where the method includes allocating an initial datacast bandwidth for transmission of the object, adjusting the datacast bandwidth allocated to one or more currently transmitted objects based at least in part on the available network bandwidth, subsequently re-allocating the datacast bandwidth used for transmission of the object, and in response to the re-allocation, adjusting the datacast bandwidth allocated to one or more currently transmitted objects based at least in part on the available network bandwidth.

In another embodiment, the present invention is directed to a method of operating a datacast platform for broadcasting a data object over a network to a client device, where the method includes providing a compound carousel for the data object, the compound carousel comprising a plurality of elementary carousels, each elementary carousel having an associated set of broadcast parameters that are independently configurable from those of the remaining elementary carousels, assigning an initial bandwidth value to the compound carousel, the initial bandwidth value representing the network bandwidth initially allocated for transmission of data objects contained in the compound carousel, in response to the initial bandwidth value, determining a bandwidth allocated to each of the plurality of elementary carousels, placing the data object into a first elementary carousel of the plurality of elementary carousels, providing the data object to a transmitter for broadcast over the network in accordance with the set of broadcast parameters associated with the first elementary carousel, moving the data object to a second elementary carousel of the plurality of elementary carousels, and providing the data object to the transmitter for broadcast over the network in accordance with the set of broadcast parameters associated with the second elementary carousel.

In another embodiment, the present invention is directed to a method of operating a datacast platform for broadcasting a data object over a network to a client device, where the method includes receiving the data object from an application, determining a desired delivery quality of service for the data object, inserting the data object into a compound carousel, the compound carousel comprising a plurality of elementary carousels, each of the plurality of elementary carousels having an associated set of broadcast parameters that are independently configurable from those of the remaining elementary carousels, assigning a bandwidth value to the compound carousel, the bandwidth value representing the network bandwidth allocated for transmission of the data object contained the compound carousel, in response to the bandwidth value and desired delivery quality of service, determining a bandwidth allocated to each of the plurality of elementary carousels, detecting a change in an operating parameter of the datacast platform; and in response to detecting the change in the operating parameter, automatically reallocating the bandwidth allocated to each of the plurality of elementary carousels, the reallocation being performed in a manner that substantially maintains the delivery quality of service for the data object.

In yet another embodiment, the present invention is directed to a datacast platform for broadcasting a data object over a network to a client device, where the platform includes a compound carousel data structure for the data object, the compound carousel comprising a plurality of elementary carousels, each elementary carousel having an associated set of broadcast parameters that are independently configurable from those of the remaining elementary carousels, and a bandwidth manager configured to assign an initial bandwidth value to the compound carousel, the initial bandwidth value representing the network bandwidth initially allocated for transmission of data objects contained in the compound carousel.

Other objects and advantages of the present invention will be apparent to one of ordinary skill in the art upon review of the detailed description of the present invention and the included figures.

DETAILED DESCRIPTION

Figure 1:
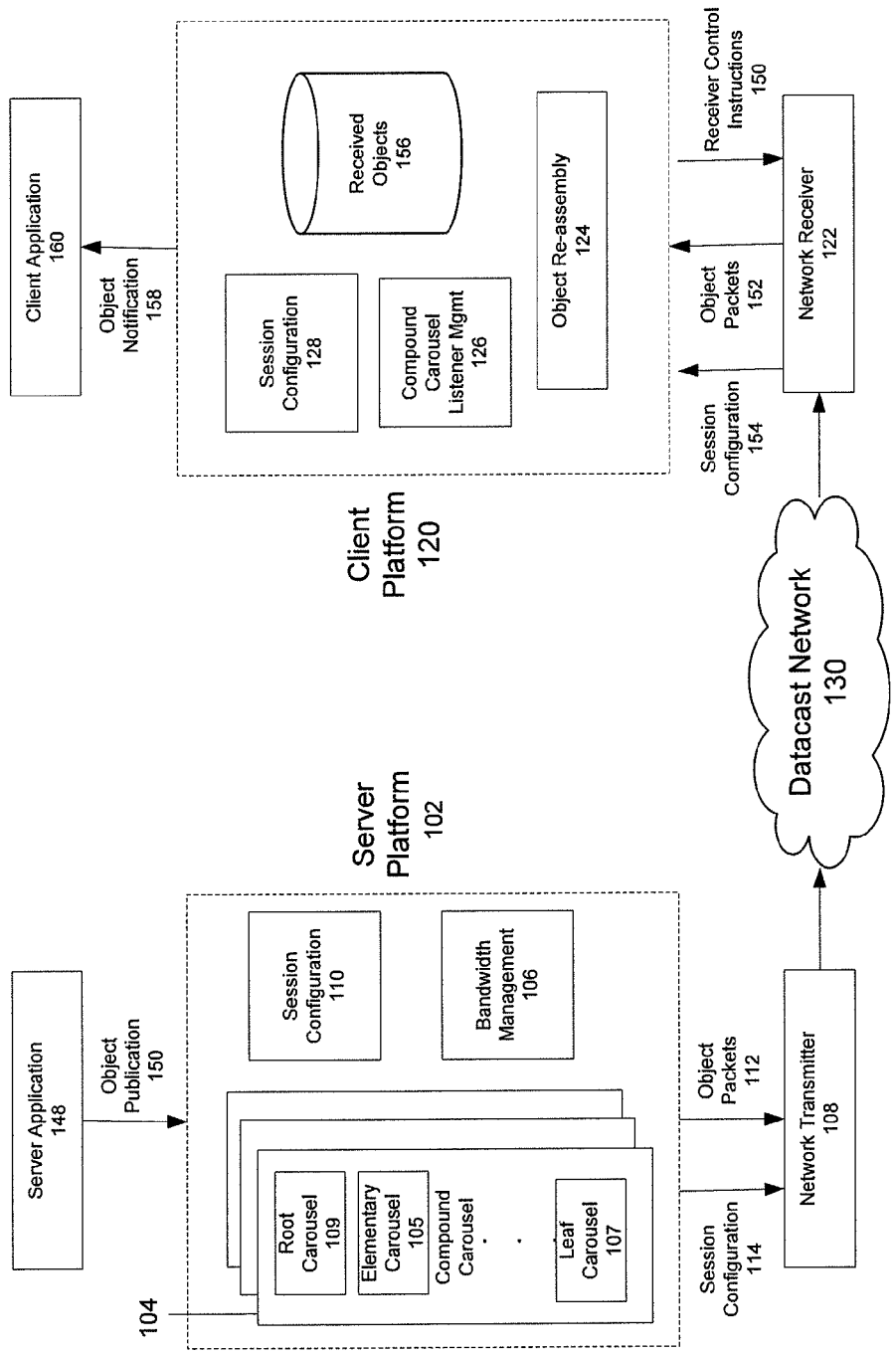
FIG. 1 is a functional block diagram illustrating the primary components of a server platform and client platform that are part of a datacast system that incorporates an embodiment of the present invention.

Embodiments of the present invention include a datacast system, and associated apparatus and method for automatically managing a data object or objects within a hierarchical carousel structure by enabling, among other functions, the dynamic allocation of bandwidth to each carousel within the structure. The dynamic bandwidth allocation enables a server platform to redistribute the bandwidth allocated to a carousel or set of data objects to adjust to desired changes in object transmission policies or priorities of a datacast application. The hierarchical carousel structure appears to the datacast application as a single entity so that the application is not required to decide which objects to transmit from which carousels. In another embodiment of the invention, a client side method is disclosed that enables the client to automatically listen to different carousels depending on the operating state of the client device. The decision as to which carousel to listen to is determined as part of the inventive method so that it appears to the client device that it is listening to a single entity.

Some embodiments of the invention disclosed hereinafter are discussed in terms of utilizing an inventive structure termed a "compound carousel." In the context of the present invention, a compound carousel is a datacast management unit that automatically provides for the differentiated allocation of transmission resources (e.g., bandwidth) on a per-object basis. In one embodiment, for example, allocation of bandwidth to a data object is allowed to vary over time for the object. The bandwidth allocation may comprise one or more of the following processes, for example: a newly added object may be transmitted immediately, an object may be removed from the carousel or allocated less bandwidth after a certain time, and/or the total bandwidth used for transmission of an object may increase or decrease. There may be multiple compound carousels in use by one or more applications, sharing a common bandwidth resource. The present invention enables each compound carousel to be managed in such a way as to optimize the Delivery Quality of Service (DQoS) for a given total carousel bandwidth (i.e., the total bandwidth allocated to all carousels within the compound carousel), where this bandwidth may vary over time.

A benefit of some embodiments of the present invention is that the detailed management of various aspects of the data object transmission are not required to be managed by the datacast applications that are providing the data objects. On the server side, applications provide the overall DQoS strategy parameters to the compound carousel manager, and then publish the data objects. On the client side, applications are notified of the arrival of a new object, while the client component of the compound carousel infrastructure manages transmission reception in such a way as to optimize client power or battery usage and other relevant resources (e.g., client data processing resources).

Note that the concept of Delivery Quality of Service (DQoS) may encompass multiple aspects of object delivery as perceived by a datacast client. The listening pattern of a client should usually be taken into account in developing a datacast management strategy, since the objective is typically to minimize the overall bandwidth usage necessary to achieve the desired DQoS. DQoS is typically concerned with one or more aspects of object delivery and may include one or more of the following attributes (the relative importance of each may be taken into account in developing the overall DQoS strategy): time taken to acquire a newly published object for a stable (currently listening) client, time taken to acquire all currently published objects for a joining (newly listening) client, or reliability of delivery for a given transmission error rate, for example.

Note that for a given available bandwidth, DQoS quality measures may need to be traded off against one another; the specific objectives will depend on the datacast application and session type, as described in more detail below. Although only exemplary, the following set of compound carousel application use cases is of interest and will be described in greater detail:

Rapid Update: Prioritized delivery of new additions to a file delivery carousel;

Rapid Update with Intermittent Listener: Prioritized delivery of new additions to a file delivery carousel for clients operating in an intermittent listening mode; and Outage Protection of event stream: A mechanism for recovery of missed one-time events.

Typically, management of a compound carousel server or server platform requires reacting to triggers for reallocation of resources in the system. These triggers may include, but are not limited to:

publication of a new object;
explicit removal of an object;
expiration of the coverage time of an object;
successful completion of reliable transmission of an object;
increase or decrease of the bandwidth available to the compound carousel; or
changes in configuration parameters of the compound carousel.

Each of these events may trigger a change to the bandwidth currently allocated to an object, as well as to control information that is being provided with the data packets.

Operation and management of a compound carousel system client or client platform may involve monitoring the packet traffic not only for object data, but also for control information that allows optimized management of the client device resources. Typically, such control information may be parsed by the client and enable the client to take certain actions in an effort to better manage client resources. For example, the server may add control information to the packets that enables the client to determine that it has received all current objects. The client may then use such information to turn off its receiver to conserve battery power. The client could then wake up (turn on its receiver) periodically to see if there has been a change in the state of the carousel or objects within the carousel. Note that this means of saving battery power is only one exemplary use of control information. The client may also, for example, use control information to enable the client to ignore packets with certain headers thus saving processing, memory and battery resources. Likewise, a client may be able to receive a new object faster since more bandwidth is allocated to the rapid update carousel so that the receiver needs to be turned on for a shorter period of time and conserve battery if it has received all current objects. These and other types of operations or management are possible with certain of the inventive cooperative client-server techniques, as are described in more detail below. Note that certain aspects of the use of control information are described in the co-pending United States Patent Application entitled "Datacasting System with Intermittent Listener Capability", Ser. No. 12/436,706, the contents of which has been incorporated by reference in its entirety into this application.

FIG. 1 is a functional block diagram illustrating the primary components of a server platform 102 and client platform 120 that are part of a datacast system 100 that incorporates an embodiment of the present invention. Server platform 102 includes one or more compound carousels 104 that are populated with data objects provided by a server application 148. Each compound carousel 104 includes one or more elementary carousels 105, one of which may serve as a root carousel 109 and one of which may serve as a leaf carousel 107. Server platform 102 further includes a bandwidth management component 106 and a session configuration component 110. Server platform 102 provides session configuration data 114 and packetized object data (object data packets) 112 to a network transmitter component 108 which is used to transmit the session configuration data 114 and object packets 112 over a datacast network 130 to a network receiver component 122. Network receiver component 122 receives the transmitted data and provides session configuration data 154 (which typically is a subset of the session configuration 112 and represents that data in which the client application is interested) and object packets 152 to client platform 120. Note that some aspects of the operation of receiver component 122 may be determined by receiver control instructions 150 provided by client platform 120. Client platform 120 further includes an object (re)assembly component 124, a compound carousel listener management component 126, a session configuration component 128, and a data storage component 156 for storing the received data objects after re-assembly of the transmitted data packets into the respective data objects. Note that object packets and session configuration data may be transmitted from server platform 102 to one or more client platforms 120 over datacast network 130.

As shown in FIG. 1, in typical operation, an object is published or otherwise provided 150 by a server application 148 to server platform 102 of the inventive system 100. Session configuration component 110 may be implemented as a data storage for the session configuration parameters. The object to be datacast is added to one of the compound carousel 104 based on the DQoS (delivered quality of service) requirements and the session configuration parameters of the compound carousel(s). Bandwidth management component 106 is responsible for managing the bandwidth allocation and usage of each of compound carousels 104. When the bandwidth allocated to a compound carousel changes, the state of each elementary carousel 105 (which may be the root carousel 109 or leaf carousel 107) within that compound carousel is updated. The object(s) added to compound carousel 104 are packetized by elementary carousel 105 in preparation for transmission over datacast network 130 by network transmitter 108. As noted, the data object packets 112 are provided to network transmitter 108 for transmission over datacast network 130.

After transport over datacast network 130, the data object packets are received by network receiver 122, which is coupled to client platform 120, some aspects of the operation of which may be controlled by signals or instructions provided by the client side elements of system 100. As shown, network receiver 122 provides the received object packets 152 to client platform 120 of the inventive system. Receiver control instructions 150 may be provided by compound carousel listener management component 126 based on the current state of the sessions and the session configuration parameters. Session configuration parameters 154 may be obtained through a suitable synchronization mechanism with server platform session configuration component 110 that occurs prior to, or during the datacast session. For this synchronization, a datacast mechanism (such as an Electronic Service Guide) or an out-of-band mechanism (such as HTTP fetch by the client of the session description) may be employed, although other suitable mechanisms are also possible. The received object packets 152 are then (re)assembled by object re-assembly component 124 into the data object or objects that were originally published by server application 148, and the client application 160 is notified of the availability of a new object by a suitable object notification mechanism 158. Note that the object may be part of the notification itself or may be stored in a data storage component for received objects 156 that client application 160 can access to retrieve the object. As discussed, compound carousel listener management component 126 controls certain aspects of the operation of network receiver 122 using receiver control instructions 150; this effectively allows the client platform to listen to the appropriate elementary carousel based on the methods described herein. In some embodiments, the operation of the listener management component is determined in whole or in part by the configuration data for a session, with that data being received as part of or as a separate transmission form the datacast.

In some embodiments of the invention described herein, there is assumed a multicast IP transport with undifferentiated packet delivery, and the modification of the per-object resource allocation consists of multicasting the packets of different objects at different rates. In some embodiments, this modification is implemented by maintaining a set of separate ALC (Asynchronous Layered Coding) protocol or FLUTE protocol (an enhancement of the ALC protocol) sessions of varying bandwidth, and moving objects from elementary carousel to elementary carousel within a compound carousel. Those of skill in the art will recognize that other techniques are possible that those techniques can be used to achieve a similar goal of per-object, time-varying delivery rate and can be used as part of this invention.

Generalized Compound Carousel Elements

As noted, in the context of the present invention a "compound carousel" is a datacast management unit that provides differentiated allocation of transmission resources on a per-object basis. That is, once an object is added, it is transmitted one or more times with resources allocated to that object in a time-varying way, such that the overall optimization goals of the compound carousel and datacast system are met. Although the end effect may reduce in a special case to a simple "carousel" (i.e., repeated serial transmission of the objects currently managed), the present invention allows the system to operate with a substantially different allocation of resources that can provide significantly improved Delivery Quality of Service (DQoS).

This allocation (in some implementations, the bandwidth used at a given instant to transmit packets corresponding to that data object) is allowed to vary over time, even for the same object. For example:

a newly added object may be transmitted immediately, with higher bandwidth allocated to it than existing objects;

an object may be removed or allocated less bandwidth after a certain time; or the total bandwidth used for transmission of the objects may increase or decrease, provided that the overall DQoS target of the compound carousel is met.

The resource management of a compound carousel takes into account interactions with the overall bandwidth management methods and goals of the datacast system. There may be multiple compound carousels, together with other demands on the available bandwidth, so that the management policy of an individual compound carousel should be capable of dynamically adjusting to external conditions, and should be able to communicate to other elements of the system that the overall resources needed by the compound carousel may have changed.

Embodiments of the invention may be described in terms of a managed collection of "elementary carousels" that have a well-defined behavior. In some embodiments, this behavior can be implemented by using techniques for managing simple carousels. Embodiments of the invention manage the bandwidth and object membership of these elementary carousels in a manner designed to optimize overall DQoS, subject to the bandwidth constraints of the compound carousel. It will be understood, however, that this management strategy can be applied in other implementations to allow time-varying resource allocation per object. For example, a single carousel can be allocated for each object, and the bandwidth allocated to each carousel can then be varied according to this management strategy.

Figure 2:
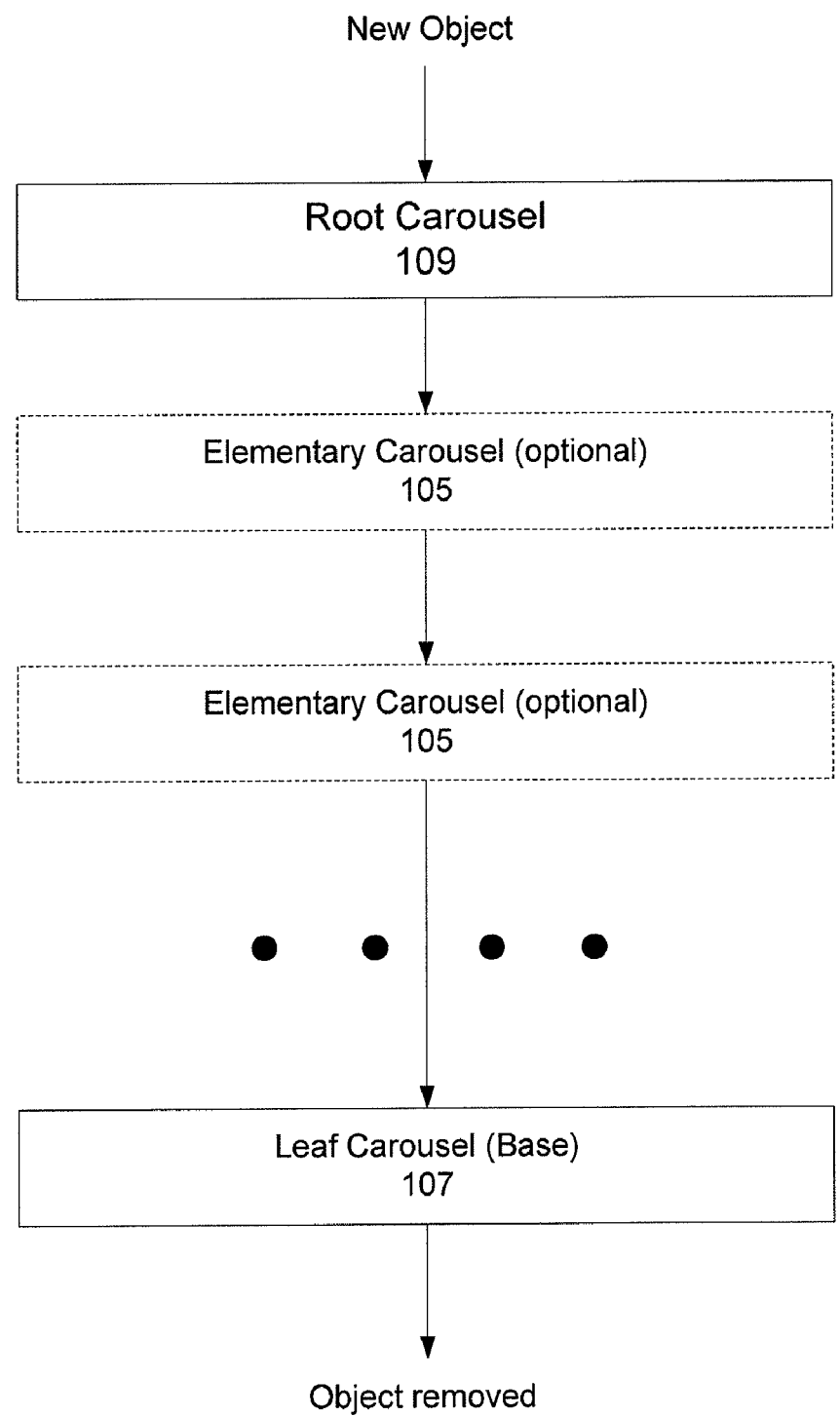
FIG. 2 is a high-level view of a compound carousel structure showing the movement of an object within the carousel.

In one embodiment, at least part of a compound carousel 104 may be constructed as a chain of elementary carousels, as shown in FIG. 2. In one implementation, each elementary carousel 105 may be implemented as a circular linked list with each list element pointing to an object to be transmitted. The head of the linked list is pointing to the object currently being transmitted. The objects in the elementary carousel are typically transmitted in sequential order.

Movement of objects within the compound carousel will now be described with reference to FIG. 2. The top level elementary carousel is referred to as the "root carousel" 109. The bottom level elementary carousel is referred as the "leaf carousel" 107. When a new object is added to a compound carousel 104, it is first added to its respective root carousel 109. When that object is to be removed from that elementary carousel, it is moved to the next elementary carousel in the chain. The object may be removed from the root carousel for a number of reasons including because it has been transmitted "reliably", or lifetime of the object of the elementary carousel expires. When the object is removed from the second elementary carousel, it is moved to the third elementary carousel and so on through the chain. Eventually, the object will reach the leaf carousel 107 and when it is removed from that carousel, it is has been completely removed from compound carousel 104.

Leaf elementary carousel 107 may optionally be marked as a "Base". When the leaf carousel is marked as a Base, whenever a file is added to compound carousel 104, it is added to both the Root and the Base (leaf elementary carousels. The file is added to the Base carousel in the case that backward compatibility is desired with clients that are able to listen to a single carousel, but are not currently configured to make use of certain features of the present invention.

When a file is removed from a compound carousel, a remove operation (or its equivalent) is issued on the Root carousel and the file is removed from all elementary carousels including the base carousel of that compound carousel. As mentioned, typically, the file exists in the base carousel only in the case that the file is added to the base carousel for backward compatibility. When a removeall operation (or its equivalent) is issued on the Root carousel, all objects are removed from all elementary carousels of the compound carousel.

Each time when an object is moved from one elementary carousel to another within a compound carousel, or is completely removed from the compound carousel, the bandwidth usage of each elementary carousel may be re-adjusted so that DQoS constraints on the datacast session can be met with the minimum bandwidth requirement. An update, including any unused bandwidth, is made available to the external bandwidth manager (e.g., element 106 in FIG. 1) for re-distribution or re-allocation as needed.

One trigger or event that causes object movement within a compound carousel is when the object has been reliably transmitted within an elementary carousel. Note that there are multiple ways to determine that the object has been reliably transmitted, and any suitable method may be used in implementing the present invention. One exemplary method to determine that the object has been transmitted reliably can be described as follows. As an example, assume N1 is the number of times a particular object has been transmitted, and N2 is the number of times that particular object needs to be transmitted for reliable delivery. Thus, it may be concluded that the object is reliably transmitted when N1 equals to N2. Note that N2 may be determined based on a number of factors. For example, the chosen transmission method is a factor. The transmission methods may include, for example, Forward Error Correction (FEC) protection or repeated transmission. The transmission method may be chosen based on, for example, the given file size and available bandwidth of the elementary carousel. Note that FEC transmission is typically reliable enough such that N2 may equal 1. For repeated transmission, N2 is determined by the size of the file, the error rate of transmission, and the available bandwidth.

The acquisition time (AT) of an elementary carousel is defined to be the maximum time for an active client to receive an object from an elementary carousel. The acquisition time is equivalent to the time that the elementary carousel needs to transmit all objects reliably once. For clients that start listening after the object starts being transmitted, it may not be possible to receive the object within the acquisition time. If the object is removed from the elementary carousel after it is reliably transmitted once, then these clients will not be able to receive the object from this elementary carousel. To allow such clients to receive the object from this elementary carousel, the object may be allowed to stay in the elementary carousel for an extra period of time, termed coverage time. This will guarantee that if a client starts listening to the compound carousel no later than the coverage time after the object is inserted into the compound carousel, it will be able to reliably receive the object.

A bandwidth manager external to the set of compound carousels assigns the bandwidth to be used for each compound carousel. Bandwidth allocation may be based on a number of factors. For example, allocation may be based on the configuration of a compound carousel. The configuration of a compound carousel takes into account a number of other factors such as: the overall bandwidth available, the acquisition time, and other QoS parameters such as error rate, transmission delays and the like. The bandwidth allocation may also be based on, for example, the dynamic bandwidth usage of each compound carousel. In this regard, a compound carousel may release some of its allocated bandwidth usage to the bandwidth manager depending on the actual bandwidth usage, or may request additional bandwidth if the allocated bandwidth was insufficient to satisfy a desired DQoS criteria. For example, if all the objects in the compound carousel have been transmitted, then no additional bandwidth is needed and the allocated, but unused bandwidth may be released back to the bandwidth manager. Note that these changes may result in reallocation of bandwidth (increase or decrease) to other sessions, where a "session" may be a compound carousel, a simple file carousel, or another type of datacast session managed by the same bandwidth manager. Note that an elementary carousel is typically not a session in itself, though it could be in the situation in which the elementary carousel is not part of a compound carousel.

In one embodiment, a compound carousel can communicate its desired bandwidth to the bandwidth manager component 106 and likewise, the bandwidth manager component can communicate to the compound carousel any changes to its allocated bandwidth.

Examples of operating procedures for a compound carousel will now be discussed. An operation or function involving a compound carousel may be triggered by an external or internal event. Such events include, but are not limited to the following examples:

An object is inserted into a compound carousel;
The lifetime of an object in an elementary carousel expires;

Reliable transmission of an object in an elementary carousel is completed;

An Object is removed from the compound carousel by the datacast application;

The bandwidth allocation for the compound carousel is changed; or

A configuration parameter of the compound carousel changes;

Further details regarding each of these exemplary events and the corresponding actions that may be included in an implementation of the present invention will now be described.

An Object is Inserted into a Compound Carousel

A datacast application publishes objects to be sent to the client application from time to time. When an object is published, the object is inserted into the compound carousel that is part of the server platform. Typically, the object is inserted into the root elementary carousel, but it may optionally also be inserted into both the root and base elementary carousels in the case that backward compatibility is desired with clients that are able to listen to a single carousel, but are not configured to take advantage of the present invention. An object may also be inserted into an elementary carousel when it finishes reliable transmission in a higher level elementary carousel and is removed from that higher level elementary carousel. The same procedures are applied to insert the objects into an elementary carousel and the root carousel. When a new object is inserted into a carousel, it is possible that the DQoS cannot be satisfied because there are too many objects in the carousel already. In such a circumstance, and based on the bandwidth usage policy, the carousel may an action such as, for example, adding the object anyway with the consequence that the DQoS is temporarily not satisfied, or simply reject the insertion altogether.

The method of inserting an object into an elementary carousel depends on the reliable transmission method that the system selects based on the factors described above. There are many suitable methods for inserting an object into an elementary carousel that are suitable for using with embodiments of the present invention. For example, in the case of FEC protection, the search starts from the current transmitting object pointer (the head of the linked list). The linked list is traversed and a new object pointer is inserted before the first object that has been transmitted at least once. Only one pointer is inserted into the linked list. In the case of repeated transmission, the search starts from the current transmitting object pointer (the head of the linked list). The new object pointer is inserted before the first object that has been transmitted at least once. Any additional instances, i.e., the remaining N1−1 times to repeat transmission, are inserted uniformly over the rest of the linked list. This will improve the probability that the client can receive the object while the object is still in the carousel.

Figure 3:
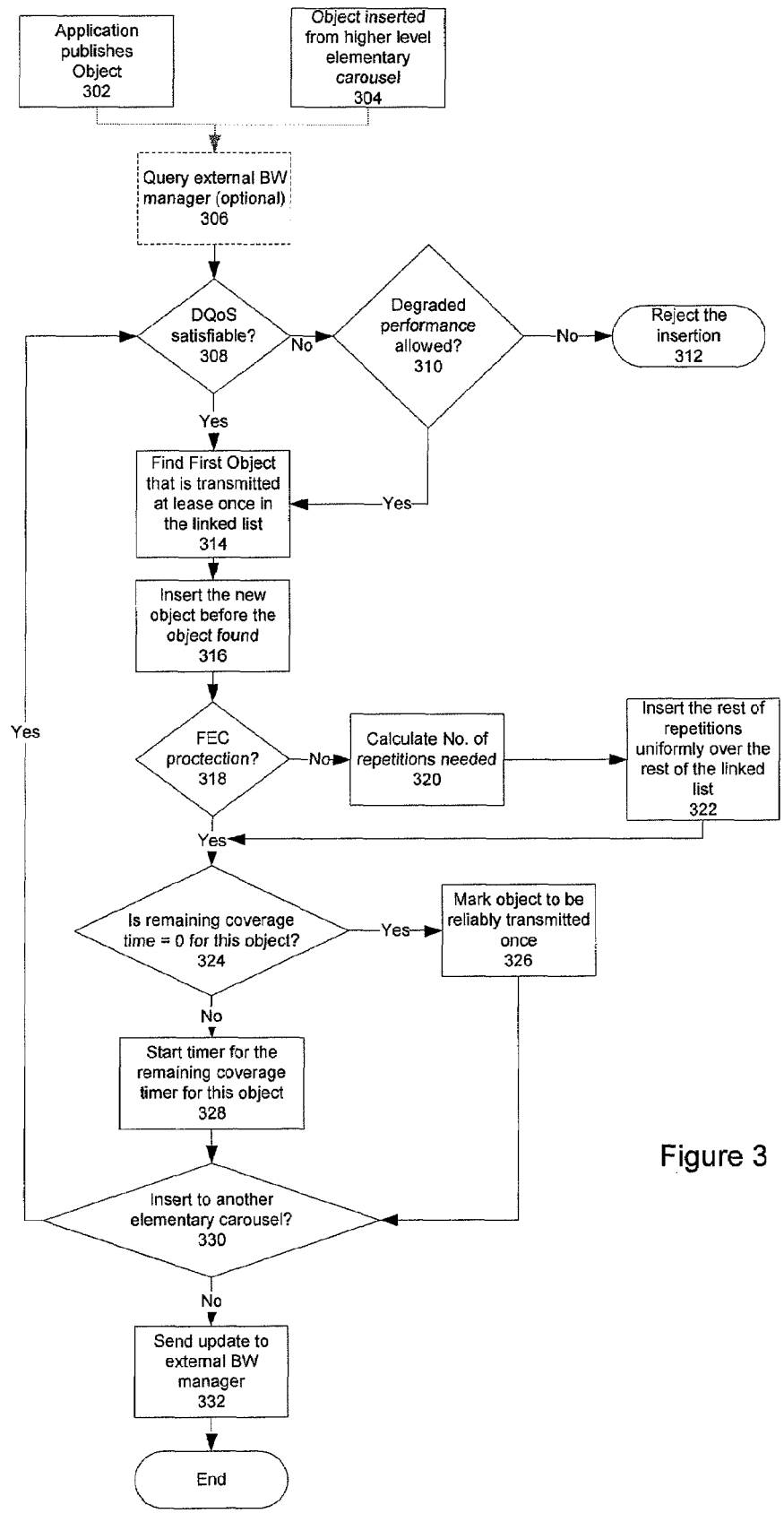
FIG. 3 is a diagram of the operation flow when an object is inserted into a compound carousel.

Details of an exemplary operation for the insertion of an object within the compound carousel are shown in FIG. 3. The following is a description of the operations or stages depicted in the figure.

1. An object is published to the compound carousel (stage 302), or an object is removed from a higher level elementary carousel (stage 304).
2. Optionally, the compound carousel can query the bandwidth manager for available bandwidth and other DQoS parameters about the compound carousel under the hypothesis that the object is added (stage 306).
3. If the DQoS is not satisfiable and temporarily performance degradation is not allowed, the insertion is rejected (stages 308, 310 and 312).
4. Find the first object in the linked list of object in the elementary carousel that is transmitted at least once (stage 314).
5. Insert the object before the object that is found in the previous step. This is equivalent to inserting the object behind the last object in the linked list that has not been transmitted yet (stage 316).
6. Based on the object size, and other DQoS parameters, choose the protection method. If FEC protection is chosen, the object is inserted into the elementary carousel only once. If repeated transmission is chosen, based on the object size, and other DQoS parameters, the invention calculates the number of repeated transmissions needed to guarantee the reliability (N1) and inserts the object N1−1 more times into the linked list uniformly (stages 318, 320 and 322).
7. If the remaining coverage time of this object in this elementary carousel is zero, mark this object to be reliably transmitted once, else start the coverage timer for this object (stages 324, 326 and 328).
8. If the object is to be inserted into another elementary carousel, repeat step 3 to step 7 above (stage 330).
9. Send a bandwidth usage update to the external bandwidth manager (stage 332).

Coverage Time of an Object in an Elementary Carousel Expires

A timer is started when an object is inserted into the compound carousel and runs for the duration of the remaining coverage time of the object in that elementary carousel. When the coverage timer of the object in an elementary carousel expires, the object is marked to be transmitted reliably once.

Figure 4:
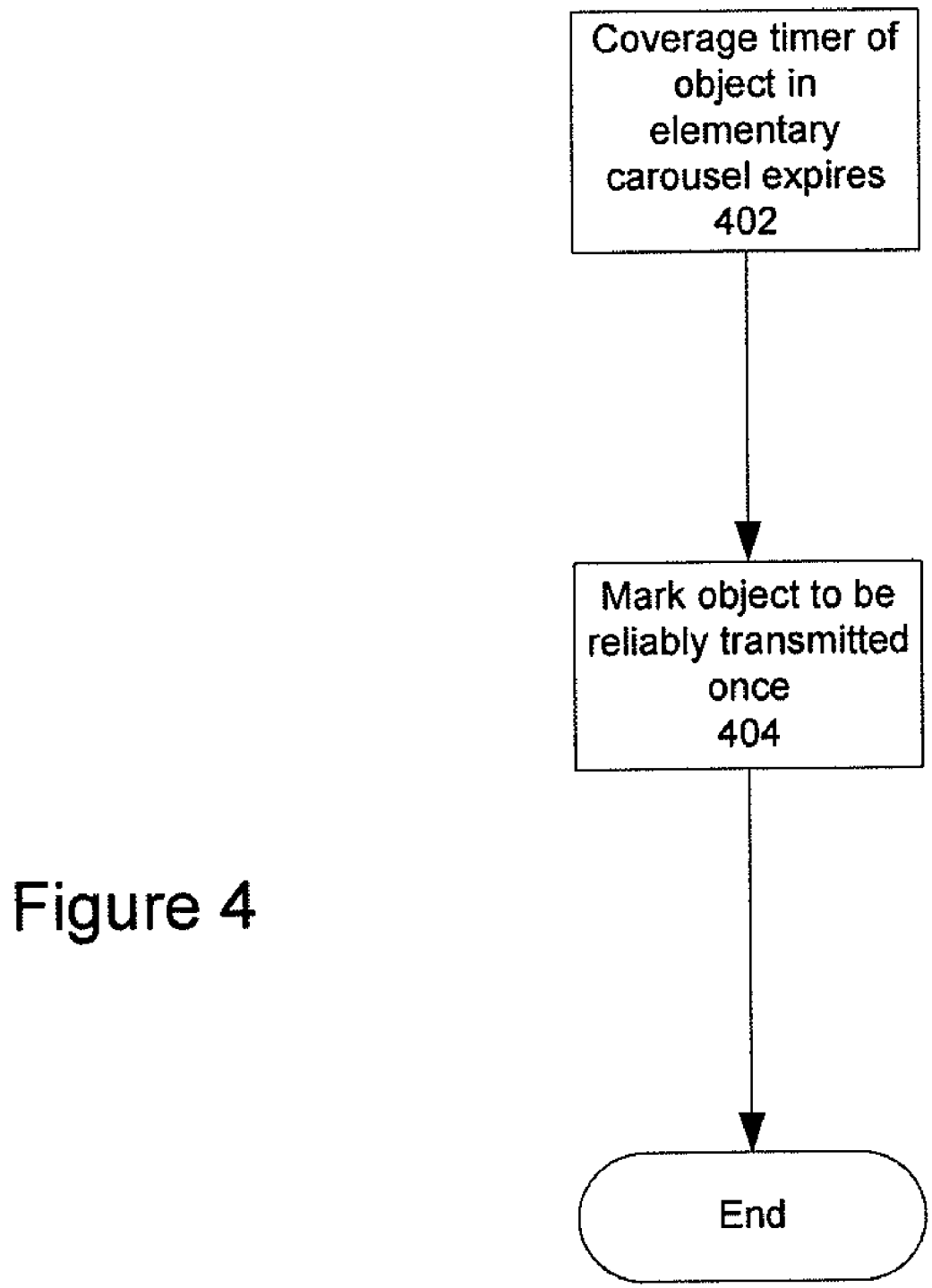
FIG. 4 is a diagram of the operation flow when the coverage time of an object in an elementary carousel expires.

Details of the operation within the compound carousel when the coverage time of an object expires are shown in FIG. 4. The following is a description of the operations or stages depicted in the figure.

1. Coverage timer of the object in an elementary carousel expires (stage 402).
2. The object is marked to be transmitted reliably once after the current transmission (stage 404) and the number of times that the object finished transmission (N1) is reset to zero. This marking is checked when the object finishes one transmission as in the following procedures.

Reliable Transmission of an Object in an Elementary Carousel is Completed

At the end of the transmission of each object, if the object is marked to be transmitted reliably once, the number of times that the object finished transmitting (N1) is incremented by one, and then compared to the number of times the object needs to be transmitted for reliable delivery (N2). If N1=N2, the object is considered to have been transmitted reliably. The object is then removed from the current carousel and inserted into the next elementary carousel in the list within the compound carousel. This method of determining reliable transmission is for purposes of example, as there are other methods to determine whether the object has been reliably transmitted and embodiments of the invention may use those methods.

As was discussed above, an object may have a coverage time associated with each elementary carousel when the object is inserted into the compound carousel. Depending on the time that the object stayed on the previous elementary carousel, the coverage time for the next carousel might have expired when the compound carousel tries to insert the object into it. In this situation the insertion is skipped and the object is instead inserted into the next available elementary carousel. If there are no more elementary carousels in the list, the object is removed from the compound carousel.

Figure 5:
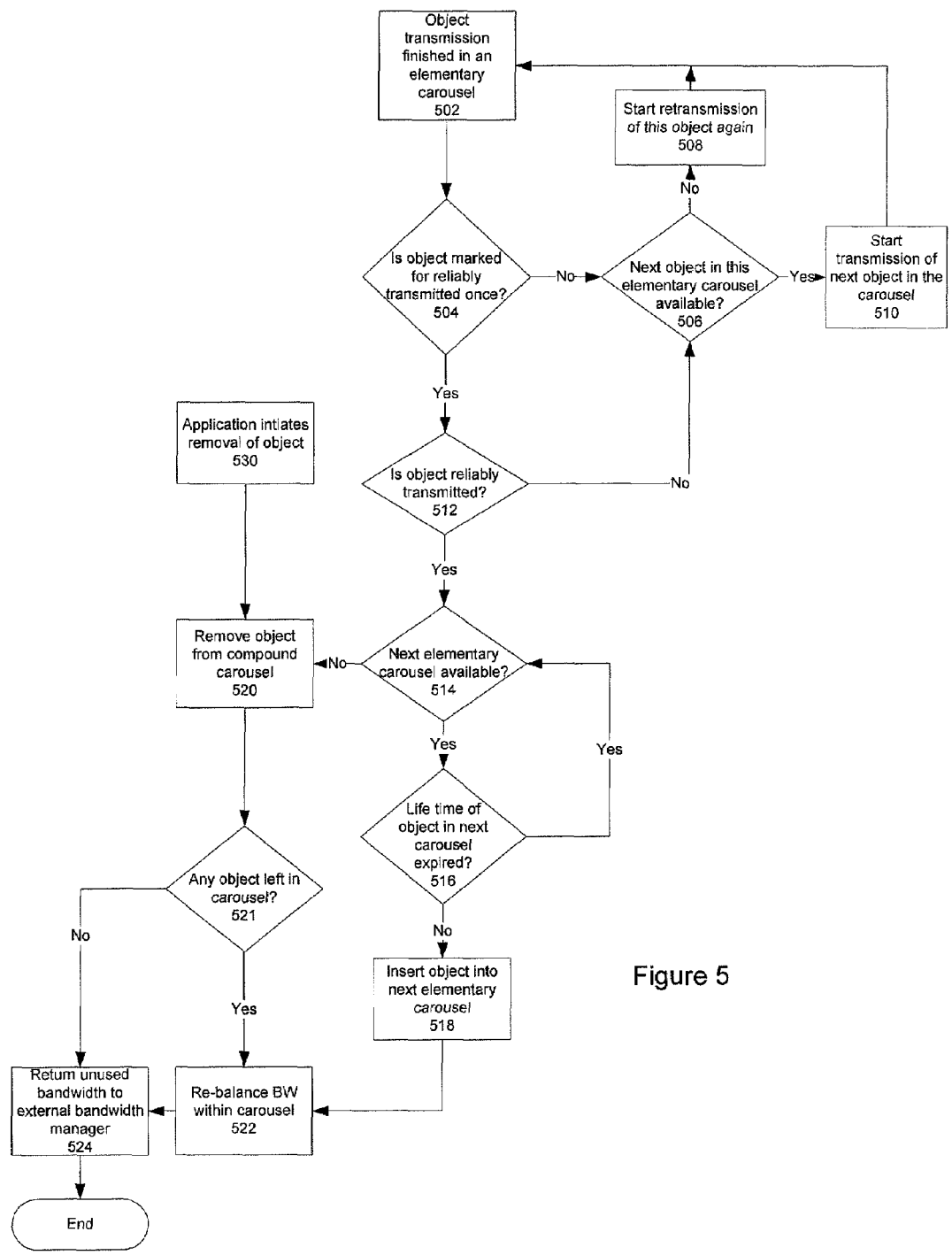
FIG. 5 is a diagram of the operation flow when transmission of an object in an elementary carousel finishes and When the application initiates the removal of an object from a compound carousel.

Details of the operation of this process within the compound carousel are shown in FIG. 5. The following is a description of the operations or stages depicted in the figure.
1. An object finishes its transmission in an elementary carousel (stage 502).
2. Check if the object is marked to be transmitted reliably once (stage 504). If this is not true and there is no other object in this elementary carousel, retransmit the object again (stages 506 and 508), otherwise, start transmission of the next object in the elementary carousel (stage 510).
3. If the object is marked to be transmitted once (stage 504) and the object is not reliably transmitted in this elementary carousel yet (stage 512), if there is no other object in this elementary carousel (stage 506), retransmit the object again (stage 508); otherwise start transmission of the next object in the elementary carousel (stage 510).
4. If the object has been transmitted reliably, check if there are any more elementary carousels in the compound carousel (stage 514).
5. If there are more elementary carousels in the compound carousel, check if the coverage time of the object in the elementary carousel has expired (stage 516).
6. If the coverage time of the object in the elementary carousel has expired, search further down the elementary carousel list until the end of list for an elementary carousel for which the coverage time has not expired (stages 514 and 516).
7. If an elementary carousel with unexpired coverage time is found, insert the object into the elementary carousel following the procedures as described above (stage 518).
8. If no elementary carousel is found that the object can be inserted into, then the object is removed from the compound carousel (stage 520).
9. If there are any other objects left in the compound carousel (stage 521), re-balance the bandwidth usages of each elementary carousel within the compound carousel (stage 522).
10. If there are no more objects left in the compound carousel (stage 521), then the bandwidth allocated to the compound carousel is returned to the external bandwidth manager (stage 524).

An Object is Removed from the Carousel by the Datacast Application

In this example, an application may decide to remove the object from the compound carousel before the expiration time specified when the object was inserted into the carousel.

When an object is removed from the compound carousel, the compound carousel stops transmitting the object. The bandwidth used by this object within the elementary carousel is returned to the elementary carousel for possible allocation to other objects. Based on the details or rules contained in the elementary carousel bandwidth usage policy, the bandwidth may be distributed to other objects in the carousel either uniformly, based on a weighted algorithm using priorities or weights, or any other suitable rule, method, process, heuristic, or algorithm. The unused bandwidth can also be distributed to other elementary carousels within the compound carousel. In addition, the unused bandwidth may be returned to the external bandwidth manager based on a number of factors such as, for example, when no object is in the compound carousel or based on the bandwidth usage policy.

Details of the operation within the compound carousel for the case when an object is removed from the carousel are shown in part of FIG. 5. The following is a description of the operations or stages depicted in the figure.
1. The application notifies the compound carousel to remove the object from the carousel (stage 530).
2. The object is removed from all elementary carousels in the compound carousel (stage 520).
3. If there are any other objects left in the compound carousel, a re-balance of the bandwidth usage of each elementary carousel within the compound carousel is implemented (stages 521 and 522).
4. If there are no more objects left in the compound carousel, the bandwidth allocated to the compound carousel is returned to the external bandwidth manager (stages 521 and 524).

The Bandwidth Allocated to the Compound Carousel is Changed

The bandwidth allocated to the compound carousel may change dynamically for various reasons. Such reasons, include, but are not limited to:
1. A high priority notification (e.g., an emergency alert) is published by an application. In this scenario, more bandwidth is needed by the carousel that handles the notification so that the notification can be sent out as quickly as possible. Since the total bandwidth within the system is constant, bandwidth usages of one or more other carousels must be adjusted to provide the extra bandwidth to the carousel that handles the notification.
2. Bandwidth is released by a carousel when an object is removed from the carousel. The released bandwidth may be re-distributed to other carousels based on a predefined policy such as, for example:
  evenly distributed to all carousels
  weighted distribution based on weights, priorities, or other criteria applicable to one or more carousels.
3. When a change of bandwidth request is received from the bandwidth manager, the bandwidth usage of each elementary carousel may be adjusted accordingly, again typically under the terms of a predefined policy:
  evenly distributed to all elementary carousels
  weighted distribution based on weights, priorities, or other criteria applicable to one or more carousels.

Figure 6:
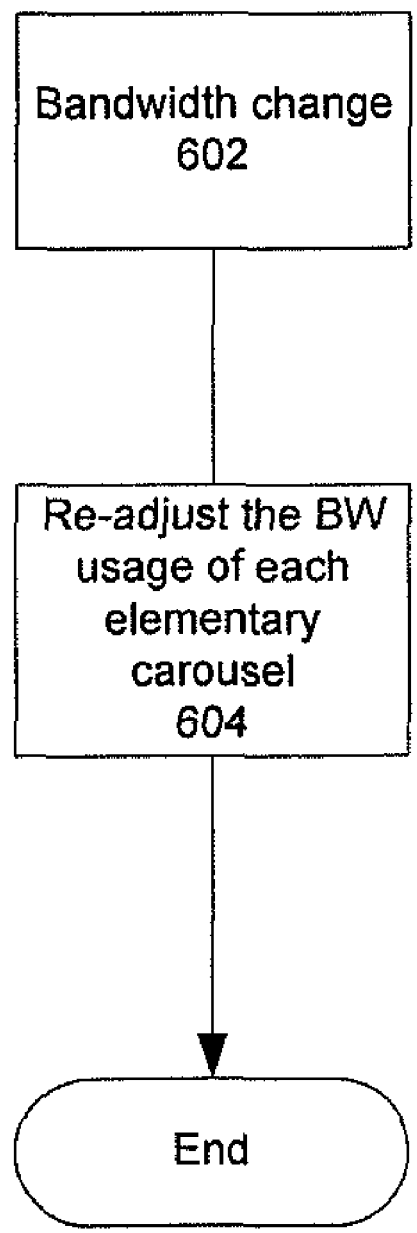
FIG. 6 is a diagram of the operation flow when the bandwidth allocated to the compound carousel changes.

An example of the operation flow of a change in the bandwidth allocation for a compound carousel is shown in FIG. 6. The following is a description of the operations or stages depicted in the figure. As shown in the figure, at stage 602 the bandwidth manager (e.g., bandwidth management component 106 of server platform 102) initiates a bandwidth change for a compound carousel based on the occurrence of an event of the type described, for example. In response, the bandwidth allocated to each elementary carousel that forms part of the affected compound carousel is re-adjusted as needed (stage 604) to achieve the desired DQoS goals for that carousel.

The Configuration of the Compound Carousel Changes

The configuration of a compound carousel can be changed by altering one or more characteristics or features of the carousel. Typical parameters that may be changed, include, but are not limited to:
  Number of elementary carousels;
  Bandwidth usage policy terms;
  Reliable transmission factors; or
  QoS parameters (delay, error rate, etc.).

When the compound carousel receives a request to change a configuration parameter, and depending on the parameter changed, it may take one or more suitable actions, including, but not limited to:
  add or remove an elementary carousel within the compound carousel; or
  re-adjust the bandwidth usage of one or more elementary carousels.

Figure 7:
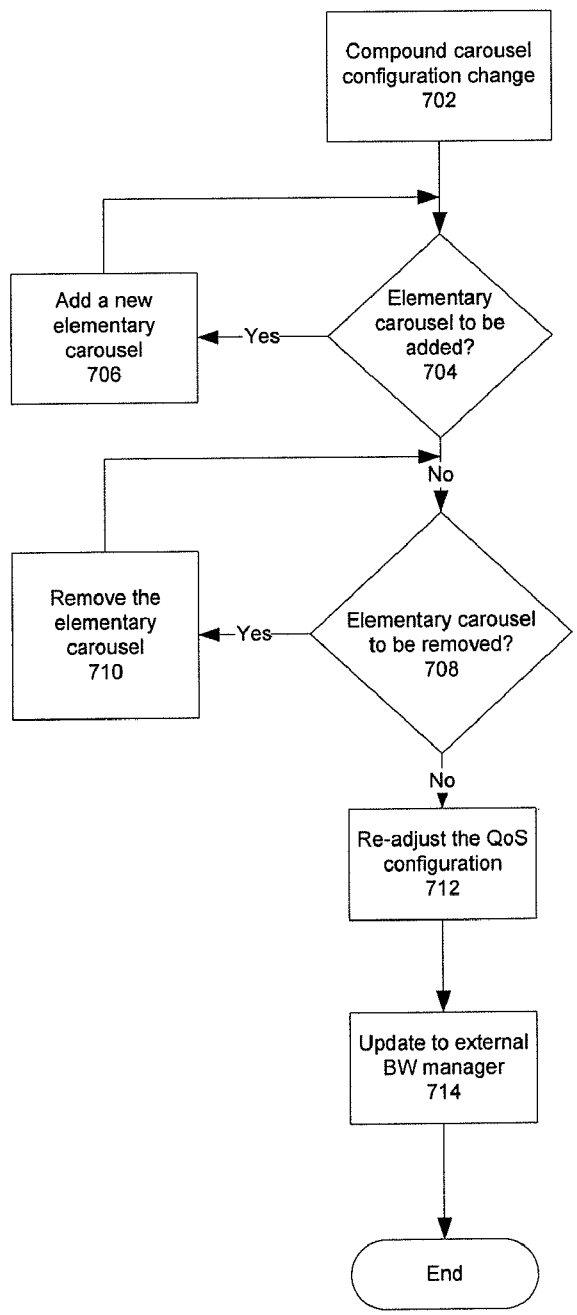
FIG. 7 is a diagram of the operation flow when configuration parameters of a compound carousel change.

Details of the operation within the compound carousel when a configuration parameter is altered are shown in part of FIG. 7. The following is a description of the operations or stages depicted in the figure.

1. A configuration update event is received in the compound carousel (stage 702).
2. A check is made to determine if a new elementary carousel is to be added to the compound carousel (stage 704). If yes, add the elementary carousel to the compound carousel with the associated configuration parameters (e.g. acquisition time, error rate, delay, etc.) (stage 706). Repeat this procedure until no more elementary carousels are to be added.
3. If a new elementary carousel is not to be added, or after completion of the addition of all elementary carousels to be added, a check is made to determine if an elementary carousel is to be removed from the compound carousel (stage 708). If yes, remove the elementary carousel from the compound carousel according to the procedures as described in FIG. 7 (stage 710). Optionally, objects that are currently on the carousel may be moved to the next elementary carousel. If this is the leaf carousel, the objects on this carousel are removed completely. Repeat this procedure until no more elementary carousels are to be removed.
4. Re-adjust the QoS configuration of the compound carousel with other parameters included in the event (stage 712).
5. Send update data to the external bandwidth manager (stage 714).

Client Operating Procedures

In a typical unidirectional data transmission, there may be multiple clients listening to the datacast server at the same time. The clients can be in different states (e.g., beginning listening at different times, having stored different amounts of data at any given time, etc.) and the server typically cannot take into account of all these states when it transmits an object. This means that there needs to be a mechanism for ensuring that each client is able to receive the entire data transmission with a desired quality of service or reliability that is independent of the client's state. To solve this problem, the server may keep transmitting the object multiple times for a period of time so that clients interested in the objects have a sufficiently high probability of receiving the object. There is also no guarantee that a client can receive the object completely when the object is being transmitted as a result of conditions that can result in errors in the reception. Depending on the time that the client starts listening to the transmission, and the reception conditions, the client may be operating in one or more of the following states:

Init state—When the device just powers up, it starts in this state;

Outage state—Some objects, or some parts of an object are missing. The client will continue to receive the objects transmitted from the server from any carousel; or Steady State—All objects published by the server have been received. The client will listen only to the root carousel for an update. When an update indicates a new object is available, it will receive the new object from the root carousel.

Figure 8:
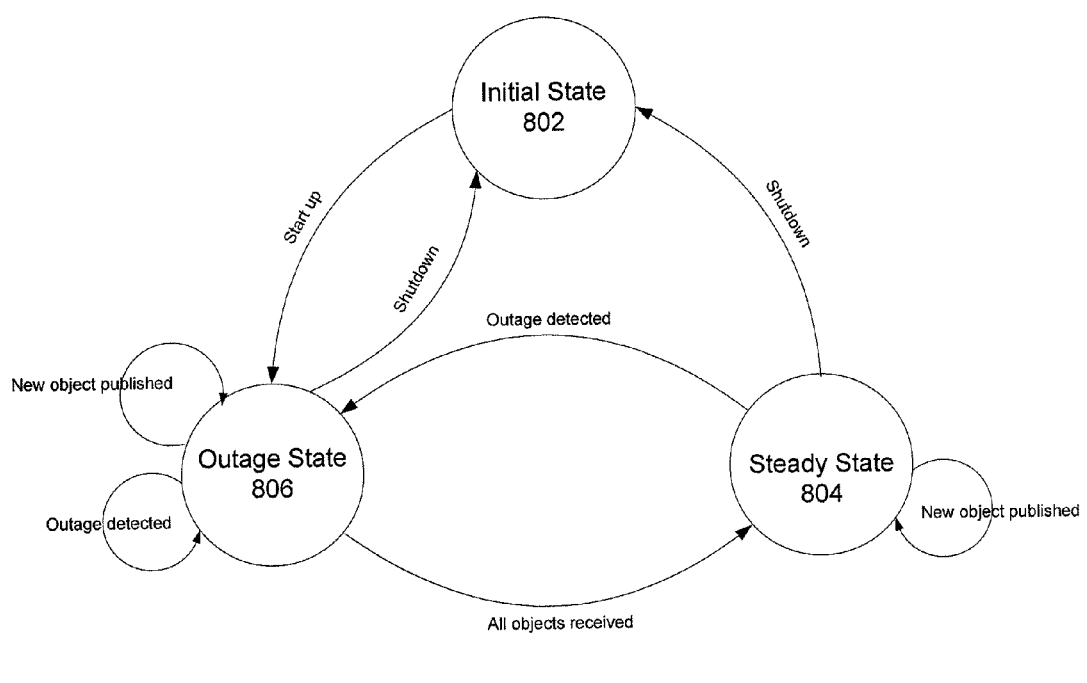
FIG. 8 is a diagram of the state transition of the operational states of a client device.

FIG. 8 is a state diagram illustrating the transitions between the operating states of the client. The figure depicts the possible client states (e.g., Initial State 802, Steady State 804, and Outage State 806) and state transitions that may be part of the overall inventive system.

There are several events that may trigger a transition between the operating states in the client:

Start up—After the device is powered up, the application starts up and this event triggers the client to start receiving of all the objects from all carousels in interest. The operating state will transit from Init state to Outage state because there are objects missing in the device;

All objects received—While the client is operating in Outage state, it will continue to receive the objects transmitted from the server from any carousel. After all objects are received successfully, an all objects received event is generated and the client operating state is changed to the Steady state and listens to the root carousel only;

New object published—From time to time, an application will publish new objects to the server. The server will then inform the client about the update. There are different methods to inform the client about the update. In case of the Flute protocol, a new FDT with the new content list is transmitted. In case of the ALC protocol, a new mini-FDT is transmitted, as described in previously filed provisional patent application U.S. 61/052,163, filed May 9, 2008, entitled "Datacasting System with Intermittent Listener", the contents of which in its entirety is incorporated by reference into this application. Other methods may be used to inform the client about the update and are understood to be suitable for use in embodiments of the present invention. Regardless of the operating state, the client will start receiving the new object from the root carousel. This event will not change the operating state of the client;

Shutdown—When the application shuts down, regardless of the current operating state, the client returns to Init state and stops receiving any object;

Outage detected—There are many possible situations that may cause an error in receiving an object while the client is operating normally:

Bad reception caused by interference

Passing through a tunnel

Inside a building

Depending on the duration of the outage, when the reception resumes, the object being received might not be available from the root carousel anymore. Methods to detect the outage include, but are not limited, to the following:

The receiver of the client device detects the signal is lost and sends the event to the client application;

In case of ALC if the client does not get the mini-FDT (as described co-pending United States Patent Application entitled "Datacasting System with Intermittent Listener Capability") for a number of consecutive mini-FDT intervals, then the client is considered in outage; or In case of Flute if the client does not get the FDT for a number of consecutive FDT intervals, then the client is considered in outage.

Since the full set of available files is known in case of Flute, if the client notices that the object it wanted on the root is not on the new FDT, then the client is considered in outage. When an outage is detected, an outage detected event is generated. Regardless of the current operation state, the client will transit to the Outage state and starts receiving from the next elementary carousel which still have the object available. The client is thus protected from the outage.

Use Cases

The following sections describe some exemplary use cases utilizing the invention. Other use cases or applications of the present invention are possible, and will be apparent to those of skill in the art.

File Delivery with Rapid Update

It is generally desirable to deliver a newly added file or data object to the clients as quickly as possible. However, to shorten the acquisition time typically requires that more bandwidth be allocated to a carousel. This is not always possible since the system bandwidth is typically limited. To effectively use the limited bandwidth, higher priority is given to the stable clients that are listening at the time when the file is published so that they can receive the file more rapidly.

In this use case scenario, two elementary carousels are configured in the compound carousel. The root elementary carousel is configured such that the acquisition time is relatively short, while the acquisition time of the base elementary carousel is made longer. This configuration can be achieved by allocating more bandwidth to the root elementary carousel and by ensuring that objects spend less time on the root carousel than on the leaf (this means that there will usually be more objects on the leaf at any given time). The coverage time for the root carousel is set to zero so that the file is transmitted from the root carousel reliably once. With such a configuration, the behavior of the server platform/compound carousel and the clients can be described as follows:

Behavior of the Server

1. A file is published by the application to the compound carousel.
2. The file is inserted into the root elementary carousel as described with regards to the general case.
3. The file is transmitted from the root elementary carousel.
4. The file is transmitted reliably once from the root elementary carousel.
5. After the file is transmitted reliably once, the file is removed from the root elementary carousel and inserted into the base elementary carousel.
6. The file will be transmitted again from the base carousel until the coverage time of the base carousel expires and then it will be transmitted reliably one last time.
7. The file is then removed from the compound carousel.
8. Bandwidth usages of each elementary carousel within the compound carousel are then re-adjusted. Any unused bandwidth is returned to the external bandwidth manager.

Behavior of the Clients

There are several possible scenarios or cases with the clients. The time required for a client to receive the file depends on when it starts listening to the carousel:

1. Stable clients that are listening to the carousel before the file is published:
   Since the acquisition time of the root elementary carousel is short, the stable client device which is online before the file is published can receive the file relatively rapidly.
2. Clients that start listening to the carousel before the file is moved to the base carousel:
   These clients will receive part of the file from the root carousel and the rest from the base carousel. The total time required to receive the file lies between the acquisition times of the two elementary carousels.
3. Clients that start listening to the carousel before the coverage time in the base carousel expires and after the file is moved to the base carousel:
   These clients will receive the file from the base carousel. The time to receive the file equals the acquisition time of the base elementary carousel.
4. Clients that start listening to the carousel after the coverage time in the base carousel expires:
   There is no guarantee that these clients can receive the complete file from the compound carousel. The client is informed of the outage state. The client application then can choose to leave the session, or use another method such as point-to-point download to obtain the file.

File Delivery with Rapid Update and Intermittent Listener (IL)

In this configuration or mode of operation, in order to conserve the battery usage of a mobile client, a client may turn off the receiver most of the time even though the device itself is switched on. Periodically, the receiver is turned on for a short period of time to check if there is any new object available from the server. If there is any new update, the client will stay on to receive the updates; otherwise the receiver is turned off again to extend the battery life. The intermittent listener (IL) concept and its benefits are described more fully in co-pending U.S. patent application Ser. No. 12/436,706, entitled "Datacasting System with Intermittent Listener Capability", the contents of which have been incorporated by reference into the present application.

For clients with such an intermittent listening feature, it is possible that the receiver is turned off when the transmitter starts transmitting the file. In that case, these clients cannot get the benefit of obtaining the rapid updates from the root carousel. To prevent clients from encountering this scenario, a coverage time may be added to the root carousel. The coverage time may be chosen such that it is longer than the period of the intermittent listener so that clients in steady state are guaranteed to be able to receive the object from the root elementary carousel. With a similar configuration as the first scenario except for the added coverage time in the root carousel, the server platform/compound carousel and clients behave as follows:

Behavior of the Server

1. An object is published by the application to the compound carousel.
2. The object is inserted into the root elementary carousel as described in the general case.
3. The object is transmitted from the root elementary carousel one or more times depending on the chosen reliability model and the coverage time of root carousel.
4. After the coverage timer expires, the object is set to be transmitted reliably one more time. This will guarantee that clients that start listening to the carousel no later than the coverage time after the object is published can receive the object reliably from the root carousel.
5. After the object is transmitted reliably once after the coverage time expires, the object is removed from the root elementary carousel and inserted into the base elementary carousel.
6. The object will be transmitted again from the base carousel until coverage time of the base carousel expires and then it will be transmitted reliably one last time.
7. The object is then removed from the compound carousel.
8. Bandwidth usages of each elementary carousel within the compound carousel are then re-adjusted. Any unused bandwidth is returned to the external bandwidth manager.

Behavior of the Clients

There are several possible scenarios or cases with the clients. The time required for a client to receive the object depends on when it starts listening to the carousel:

1. Stable clients that are listening to the carousel before the object is published:
   Since the coverage time is chosen to be longer than the period of the intermittent listener, the receiver of the client is guaranteed to be turned on at least once in order to detect the update before the coverage time expires. After an update is detected, the receiver will stay on to receive the new object from the root elementary carousel.
   Since the acquisition time of the root elementary carousel is short, the stable client device which is online before the object is published can receive the object relatively rapidly.
2. Clients switch on and start listening to the carousel before the coverage time in the root carousel expires:

Since the file will still be transmitted from the root carousel reliably, these clients receive the object relatively rapidly with the same acquisition time as the first case.

3. Clients start listening to the carousel after the coverage time in the root carousel expires and before the object is moved to the base carousel:

These clients will receive part of the object from the root carousel and the rest from the base carousel. The time to receive the object lies between the acquisition times of the two elementary carousels.

4. Clients start listening to the carousel before the coverage time in the base carousel expires and after the object is moved to the base carousel:

These clients will receive the object from the base carousel. The time to receive the object is equal to the acquisition time of the base elementary carousel.

5. Clients start listening to the carousel after the coverage time in the base carousel expires:

There is no guarantee that these clients can receive the object.

Outage Protection of Event Stream

Due to the nature of unidirectional transmission, there may be situations in which a client cannot receive one of the data objects or events published by an application. For example:

The client is powered off when the event is transmitted at the root carousel;

Bad reception caused by interference;

Client is suffering from poor reception due to passing through a tunnel;

Client is suffering from poor reception due to being inside a building; or

Other situations causing unreliable reception characteristics.

It is desirable to enable the client to recover from such scenarios so that the event is not missed. Two methods that may be used separately or in combination are configuring the compound carousel with two elementary carousels and a non-zero coverage time for the root carousel:

The client is protected while the event object is still being transmitted from the root carousel. As long as the client starts listening before the coverage time out in the root carousel, it will receive the event object rapidly from the root carousel.

If the client misses the time to receive the event object from the root carousel, it still will be able to receive the event object from the base carousel. With such a configuration, the server platform/compound carousel and clients behave as follows:

Behavior of the Server

1. An event object is published by the application to the compound carousel.
2. The event object is inserted into the root elementary carousel as described in the general case.
3. The event object is transmitted from the root elementary carousel one or more times depending on the chosen reliability model and the coverage time of root carousel.
4. After the coverage timer expires, the event object is set to be transmitted reliably one more time. This will guarantee that clients that start listening to the carousel no later than the coverage time after the event object is published can receive the event object reliably from the root carousel.
5. After the event object is transmitted reliably once after the coverage time expires, the event object is removed from the root elementary carousel and inserted into the base elementary carousel.
6. The event object will be transmitted again from the base carousel until coverage time of the base carousel expires and then it will be transmitted reliably one last time.
7. The event object is then removed from the compound carousel.
8. Bandwidth usages of each elementary carousel within the compound carousel are then re-adjusted. Any unused bandwidth is returned to the external bandwidth manager.

Behavior of the Clients

There are several possible scenarios or cases with the clients. The time required for a client to receive the event object depends on when it starts listening to the carousel:

1. Stable clients that are listening to the carousel before the event object is published:

Since the acquisition time of the root elementary carousel is short, the stable client device which is online before the event object is published can receive the event object very rapidly.

2. Clients start listening to the carousel before the coverage time in the root carousel expires:

Since the event object will still be transmitted from the root carousel reliably, these clients receive the event object relatively rapidly with the same acquisition time as the first case.

3. Clients start listening to the carousel after the coverage time in the root carousel expires and before the event object is moved to the base carousel:

These clients will receive part of the event object from the root carousel and the rest from the base carousel. The time to receive the event object lies between the acquisition times of the two elementary carousels.

4. Clients start listening to the carousel before the coverage time in the base carousel expires and after the event object is moved to the base carousel:

These clients will receive the event object from the base carousel. The time to receive the event object is equal to the acquisition time of the base elementary carousel.

5. Clients start listening to the carousel after the coverage time in the base carousel expires:

There is no guarantee that these clients can receive the event object.

File Delivery with Rapid Update, Outage Protection and Legacy Support

The techniques illustrated by the previous use cases may be combined to provide an embodiment of the present invention in which a file delivery session is automatically provided with a rapid update feature (so that stable listeners can listen to the update stream only) and outage protection for the rapid update (so that outage victims can moderately quickly repair coverage losses). In addition, the base carousel used by initial listeners can also be used by legacy clients that are only aware of a single carousel; in this case it is advantageous to populate the base carousel immediately. To provide these features, a compound carousel with three elementary carousels can be used. The root carousel is configured for rapid update; the second carousel is configured for outage protection; and the base carousel is configured for legacy support. In such a case, the behavior of the server platform/compound carousel and clients is as follows:

Behavior of the Server

1. A file is published by the application to the compound carousel.
2. The file is inserted into the root elementary carousel as described in the general case and the base elementary carousel at the same time.
3. The file is transmitted from the root elementary carousel one or more times depending on the chosen reliability model and the coverage time of root carousel.
4. After the coverage timer expires, the file is set to be transmitted reliably one more time. This will guarantee that clients that start listening to the carousel no later than the coverage time after the file is published can receive the file reliably from the root carousel.
5. After the file is transmitted reliably once after the coverage time expires, the file is removed from the root elementary carousel and inserted into the second elementary carousel.
6. The file will be transmitted again from the base carousel until coverage time of the second carousel expires and then it will be transmitted reliably one last time.
7. The file is then removed from the compound carousel.
8. The file is transmitted from the base carousel in parallel with the root carousel and the second carousel at the same time.
9. The file is removed from the base elementary carousel after the coverage time expires and the file is transmitted reliably one last time.
10. Bandwidth usages of each elementary carousel within the compound carousel are then re-adjusted. Any unused bandwidth is returned to the external bandwidth manager.

Behavior of the Clients

There are several possible scenarios or cases with the clients. For newer devices that incorporate the present invention's capability of listening to a compound carousel, the behavior may be described as follows:
1. Stable clients that are listening to the carousel before the file is published:
    Since the acquisition time of the root elementary carousel is short, the stable client device which is online before the file is published can receive the file relatively rapidly.
2. Clients start listening to the carousel before the coverage time in the root carousel expires:
    Since the file will still be transmitted from the root carousel reliably, these clients receive the file relatively rapidly with the same acquisition time as the first case.
3. Clients start listening to the carousel after the coverage time in the root carousel expires and before the file is moved to the second carousel:
    These clients will receive part of the file from the root carousel and the rest from the second carousel. The time to receive the file lies between the acquisition times of the root and second elementary carousels.
4. Clients start listening to the carousel before the coverage time in the base carousel expires and after the file is moved to the second elementary carousel:
    These clients will receive the file from the base carousel. The time to receive the file is equal to the acquisition times of the second elementary carousel.
5. Clients start listening to the carousel after the coverage time in the base carousel expires:
    There is no guarantee that these clients can receive the file.

Legacy devices that do not support listening to a compound carousel will listen to the base carousel only and will have the following behavior:
1. Stable clients that are listening to the base carousel before the file is published or before the coverage time expires:
    The file will be received from the base carousel.
2. Clients start listening to the carousel after the coverage time in the base carousel expires:
    There is no guarantee that these clients can receive the file from the base carousel.

A datacasting system and associated apparatus and methods have been described for efficiently managing the allocation of system resources such as bandwidth in situations where the type or number of data objects being broadcast changes overtime. In some embodiments, the inventive system utilizes a compound carousel as an element of the system, where a compound carousel may include one or more elementary carousels. Each elementary carousel contains a data object or objects to be broadcast by the datacast system, with movement of the objects within the compound carousel and the allocation of bandwidth or other system resources to the objects and carousels being determined by the invention.

Figure 9:
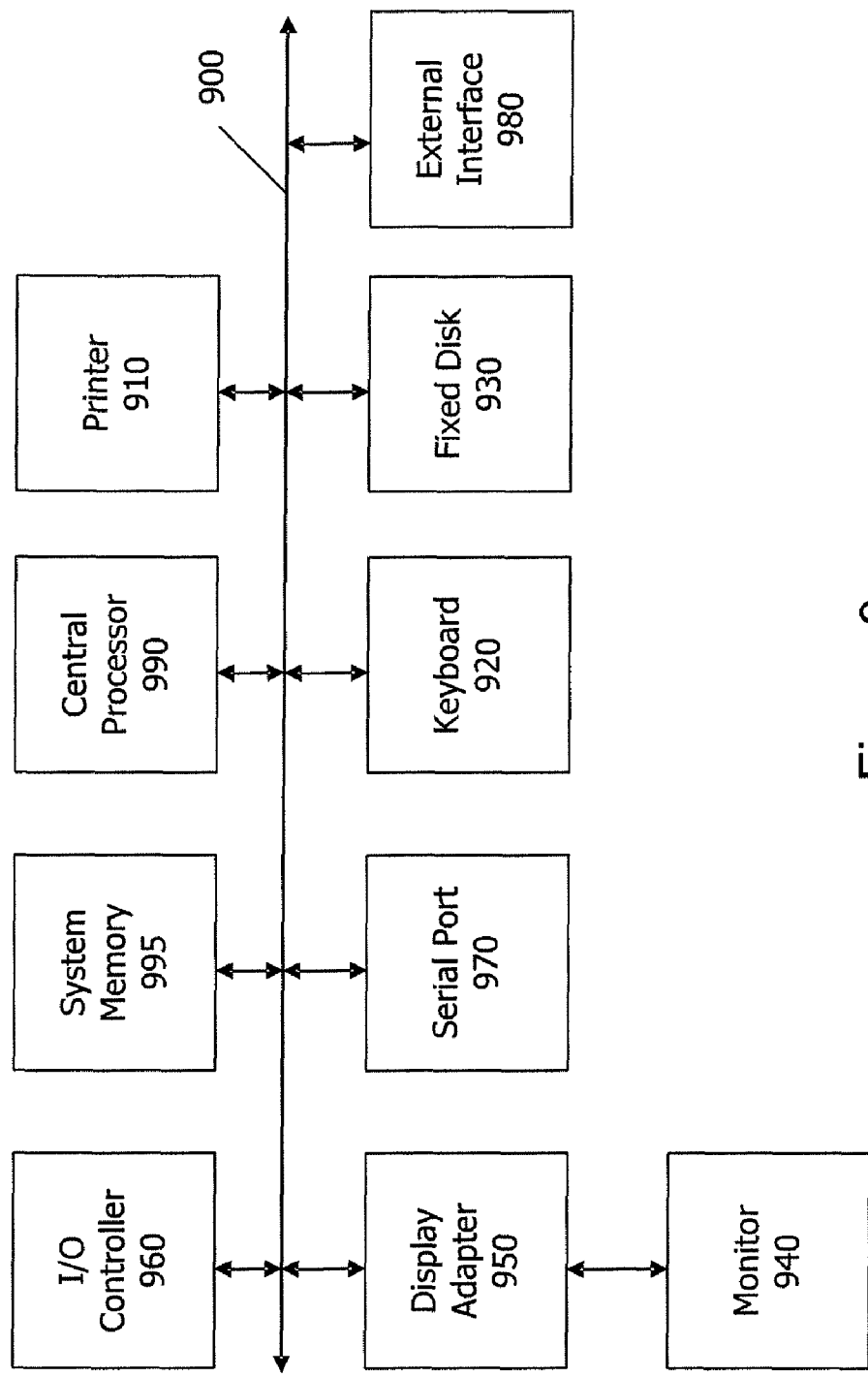
FIG. 9 is a block diagram of elements that may be present in a computer device or system configured to implement a method or process of the present invention.

In some embodiments, the inventive system, apparatus, methods, processes or operations for managing and efficiently datacasting data objects may be wholly or partially implemented in the form of a set of instructions executed by a central processing unit (CPU) or microprocessor. The CPU or microprocessor may be incorporated in an apparatus, server, client or other computing device operated by, or in communication with, other components of the inventive system. As an example, FIG. 9 is a block diagram of elements that may be present in a computer device or system configured to implement a method or process of the present invention. The subsystems shown in FIG. 9 are interconnected via a system bus 900. Additional subsystems such as a printer 910, a keyboard 920, a fixed disk 930, a monitor 940, which is coupled to a display adapter 950, and others are shown. Peripherals and input/output (I/O) devices, which couple to an I/O controller 960, can be connected to the computer system by any number of means known in the art, such as a serial port 970. For example, the serial port 970 or an external interface 980 can be used to connect the computer apparatus to a wide area network such as the Internet, a mouse input device, or a scanner. The interconnection via the system bus 900 allows a central processor 990 to communicate with each subsystem and to control the execution of instructions that may be stored in a system memory 995 or the fixed disk 930, as well as the exchange of information between subsystems. The system memory 995 and/or the fixed disk 930 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a," "an," or "the" is intended to mean "at least one," unless specifically indicated to the contrary.

What is claimed is:

1. A method of operating a datacast platform for broadcasting a plurality of data objects over a network to a plurality of client devices, comprising:

allocating an initial datacast bandwidth to a compound carousel for transmission of the plurality of data objects, the compound carousel comprising a plurality of elementary carousels, each elementary carousel having an associated set of broadcast parameters that are independently configurable from those of the remaining elementary carousels and each elementary carousel configured at least to transmit data objects placed on the elementary carousel one after another in a cyclical fashion;

allocating a plurality of datacast bandwidths to the plurality of elementary carousels based at least in part on the initial datacast bandwidth allocated to the compound carousel;

placing a first data object and a second data object of the plurality of data objects into a first elementary carousel of the plurality of elementary carousels and providing the first data object and the second data object for broadcast over the network in accordance with the set of broadcast parameters associated with the first elementary carousel;

adjusting the datacast bandwidth allocated to the compound carousel based at least in part on the available network bandwidth; and responsive to the adjusting, moving the first data object to a second elementary carousel of the plurality of elementary carousels such that the first data object is broadcast over the network in accordance with the set of broadcast parameters associated with the second elementary carousel while the second data object is broadcast over the network in accordance with the set of broadcast parameters associated with the first elementary carousel.

2. The method of claim 1, wherein the initial and subsequent datacast bandwidth allocated to the data object are based at least in part on a desired delivery quality of service parameter for the object.

3. A method of operating a datacast platform for broadcasting a plurality of data objects over a network to a plurality of client devices, comprising:

providing a compound carousel for the plurality of data objects, the compound carousel comprising a plurality of elementary carousels, each elementary carousel having an associated set of broadcast parameters that are independently configurable from those of the remaining elementary carousels and each elementary carousel configured at least to transmit data objects placed on the elementary carousel one after another in a cyclical fashion;

assigning an initial bandwidth value to the compound carousel, the initial bandwidth value representing the network bandwidth initially allocated for transmission of data objects contained in the compound carousel;

in response to the initial bandwidth value, determining a bandwidth allocated to each of the plurality of elementary carousels;

placing a first data object and a second data object into a first elementary carousel of the plurality of elementary carousels;

responsive to the placing, providing the first data object and the second data object to a transmitter for broadcast over the network in accordance with the set of broadcast parameters associated with the first elementary carousel;

moving the first data object to a second elementary carousel of the plurality of elementary carousels, the second data object remaining in the first elementary carousel; and responsive to the moving, providing the first data object to the transmitter for broadcast over the network in accordance with the set of broadcast parameters associated with the second elementary carousel while the second data object is broadcast over the network in accordance with the set of broadcast parameters associated with the first elementary carousel.

4. The method of claim 3, further comprising allocating a bandwidth value to each elementary carousel in use at a given time.

5. The method of claim 3, wherein the bandwidth value allocated to the elementary carousels is based at least in part on a desired delivery quality of service parameter for the objects currently on the carousels.

6. The method of claim 3, further comprising:

detecting a change in an operating parameter of the datacasting platform; and in response to detecting the change in the operating parameter, reconfiguring the set of broadcast parameters associated with one or more of the elementary carousels.

7. The method of claim 6, wherein the change in the operating parameter comprises one of receiving a new data object to be broadcast, removal of a data object from the compound carousel, expiration of the coverage time of a data object, completion of the reliable transmission of a data object, or a change in the available bandwidth for the compound carousel.

8. The method of claim 6, wherein reconfiguring the set of broadcast parameters associated with one or more of the elementary carousels further comprises changing the bandwidth allocated to the one or more of the elementary carousels.

9. The method of claim 3, wherein at least one of the plurality of client devices receives a first portion of the first data object in accordance with the set of broadcast parameters associated with the first elementary carousel and a second portion of the first data object in accordance with the set of broadcast parameters associated with the second elementary carousel.

10. The method of claim 9, wherein the first data object is moved from the first elementary carousel to the second elementary carousel to optimize a time taken by the plurality of client devices to acquire the plurality of data objects.

11. The method of claim 3, wherein the plurality of elementary carousels are arranged in a chain with in the compound carousel and at least the first data object is moved between the elementary carousels in an order of the chain.

12. A method of operating a datacast platform for broadcasting a plurality of data objects over a network to a plurality of client devices, comprising:

receiving the plurality of data objects from at least one application, each of the plurality of data objects being associated with a desired delivery quality of service;

inserting the plurality of data objects into a compound carousel, the compound carousel comprising a plurality of elementary carousels, each of the plurality of elementary carousels having an associated set of broadcast parameters that are independently configurable from those of the remaining elementary carousels and each of the plurality of elementary carousel configured at least to transmit data objects placed on the elementary carousel one after another in a cyclical fashion;

assigning a bandwidth value to the compound carousel, the bandwidth value representing the network bandwidth allocated for transmission of data objects contained the compound carousel;

determining a bandwidth allocation for each of the plurality of elementary carousels based at least in part on the bandwidth value assigned to the compound carousel and the desired delivery quality of service associated with each of the plurality of data objects;

placing a first data object and a second data object of the plurality of data objects into a first elementary carousel of the plurality of elementary carousels and providing the first data object and the second data object for broadcast over the network in accordance with the set of broadcast parameters associated with the first elementary carousel;

detecting a change in an operating parameter of the datacast platform; and in response to detecting the change in the operating parameter, moving the first data object to a second elementary carousel of the plurality of elementary carousels such that the first data object is broadcast over the network in accordance with the set of broadcast parameters associated with the second elementary carousel while the second data object is broadcast over the network in accordance with the set of broadcast parameters associated with the first elementary carousel, wherein the second elementary carousel is selected from the plurality of elementary carousels at least in part based on the set of broadcast parameters associated with the second elementary carousel and the desired delivery quality of service associated with each of the plurality of data objects.

13. The method of claim 12, wherein the change in the operating parameter comprises one of receiving a new data object to be broadcast, removal of a data object from the compound carousel, expiration of the coverage time of a data object, completion of reliable transmission of a data object, or a change in the available bandwidth for the compound carousel.

14. The method of claim 12, wherein the plurality of elementary carousels includes an elementary carousel configured as an update carousel.

15. The method of claim 12, wherein the plurality of elementary carousels includes an elementary carousel configured for outage protection.

16. The method of claim 12, wherein the plurality of elementary carousels includes an elementary carousel configured for support of legacy devices.

17. The method of claim 12, wherein the plurality of elementary carousels includes a root elementary carousel configured for rapid update, an elementary carousel configured for outage protection, and a base elementary carousel configured for support of legacy devices.

18. A datacast platform for broadcasting a plurality of data objects over a network to a plurality of client devices, comprising:

a compound carousel for the plurality of data objects, the compound carousel comprising a plurality of elementary carousels, each elementary carousel having an associated set of broadcast parameters that are independently configurable from those of the remaining elementary carousels and each elementary carousel configured at least to transmit data objects placed on the elementary carousel one after another in a cyclical fashion, and the compound carousel configured to, at least:

place a first data object and a second data object of the plurality of data objects into a first elementary carousel of the plurality of elementary carousels and provide the first data object and the second data object for broadcast over the network in accordance with the set of broadcast parameters associated with the first elementary carousel; and move the first data object to a second elementary carousel of the plurality of elementary carousels such that the first data object is broadcast over the network in accordance with the set of broadcast parameters associated with the second elementary carousel while the second data object is broadcast over the network in accordance with the set of broadcast parameters associated with the first elementary carousel;

a bandwidth manager configured at least to assign an initial bandwidth value to the compound carousel, the initial bandwidth value representing the network bandwidth initially allocated for transmission of data objects contained in the compound carousel; and at least one processor configured to execute a set of instructions that implement at least the compound carousel and the bandwidth manager.

19. The datacast platform of claim 18, wherein the bandwidth manager is further configured to determine a bandwidth allocated to each of the elementary carousels.

20. The datacast platform of claim 19, wherein the bandwidth manager determines the bandwidth allocated to each of the elementary carousels based at least in part on the initial bandwidth value and a desired delivery quality of service associated with each data object.

21. The datacast platform of claim 20, wherein the bandwidth manager is further configured to automatically reallocate the bandwidth allocated to at least one of the plurality of elementary carousels in response to detecting a change in an operating parameter of the datacast platform, the reallocation being performed in a manner that substantially maintains the delivery quality of service associated with each data object.

22. The datacast platform of claim 21, wherein the change in the operating parameter comprises one of receiving a new data object to be broadcast, removal of a data object from the compound carousel, expiration of the coverage time of a data object, completion of reliable transmission of a data object, or a change in the available bandwidth for the compound carousel.

23. The datacast platform of claim 18, wherein the compound carousel data structure includes one or more of: a carousel configured as an update carousel, a carousel configured for outage protection, and a carousel configured for support of legacy devices.

24. A datacast platform, comprising:

a processor;

a memory communicatively coupled with the processor; and a set of instructions stored in the memory, which when executed by the processor implement a method to, at least:

receive a plurality of data objects from at least one application, each of the plurality of data objects being associated with a desired delivery quality of service;

insert the plurality of data objects into a compound carousel, the compound carousel comprising a plurality of elementary carousels, each of the plurality of elementary carousels having an associated set of broadcast parameters that are independently configurable from those of the remaining elementary carousels and each elementary carousel configured at least to transmit data objects placed on the elementary carousel one after another in a cyclical fashion;

assign a bandwidth value to the compound carousel, the bandwidth value representing a network bandwidth allocated for transmission of data objects contained in the compound carousel;

determine a bandwidth allocation for each of the plurality of elementary carousels based at least in part on the bandwidth value assigned to the compound carousel and the desired delivery quality of service associated with each of the plurality of data objects;

place a first data object and a second data object of the plurality of data objects into a first elementary carousel of the plurality of elementary carousels and provide the first data object and the second data object for broadcast over a network in accordance with the set of broadcast parameters associated with the first elementary carousel;

detect a change in an operating parameter of the datacast platform; and in response to detecting the change in the operating parameter, move the first data object to a second elementary carousel of the plurality of elementary carousels such that the first data object is broadcast over the network in accordance with the set of broadcast parameters associated with the second elementary carousel while the second data object is broadcast over the network in accordance with the set of broadcast parameters associated with the first elementary carousel, wherein the second elementary carousel is selected from the plurality of elementary carousels at least in part based on the set of broadcast parameters associated with the second elementary carousel and the desired delivery quality of service associated with each of the plurality of data objects.

25. The datacast platform of claim 24, wherein the change in the operating parameter comprises one of receiving a new data object to be broadcast, removal of a data object from the compound carousel, expiration of the coverage time of a data object, completion of reliable transmission of a data object, or a change in the available bandwidth for the compound carousel.

* * * * *